(12) United States Patent
Lee et al.

(10) Patent No.: US 10,270,102 B2
(45) Date of Patent: Apr. 23, 2019

(54) ELECTRODE FOR ELECTROCHEMICAL DEVICE WITH LOW RESISTANCE, METHOD FOR MANUFACTURING THE SAME, AND ELECTROCHEMICAL DEVICE COMPRISING THE ELECTRODE

(71) Applicant: LG Chem, Ltd., Seoul (KR)

(72) Inventors: Sang-Kyun Lee, Daejeon (KR);
Byoung-Bae Lee, Daejeon (KR);
Ki-Young Kwon, Daejeon (KR);
Bok-Kyu Choi, Daejeon (KR);
Sei-Woon Oh, Daejeon (KR)

(73) Assignee: LG Chem, Ltd. (KR)

( * ) Notice: Subject to any disclaimer, the term of this patent is extended or adjusted under 35 U.S.C. 154(b) by 550 days.

(21) Appl. No.: 14/437,976

(22) PCT Filed: Mar. 19, 2014

(86) PCT No.: PCT/KR2014/002313
§ 371 (c)(1),
(2) Date: Apr. 23, 2015

(87) PCT Pub. No.: WO2014/148819
PCT Pub. Date: Sep. 25, 2014

(65) Prior Publication Data
US 2015/0270552 A1    Sep. 24, 2015

(30) Foreign Application Priority Data

Mar. 19, 2013 (KR) ........................ 10-2013-0029335
Mar. 19, 2014 (KR) ........................ 10-2014-0031969

(51) Int. Cl.
*H01M 4/62*    (2006.01)
*H01M 4/04*    (2006.01)
(Continued)

(52) U.S. Cl.
CPC ......... *H01M 4/622* (2013.01); *H01M 4/0404* (2013.01); *H01M 4/13* (2013.01);
(Continued)

(58) Field of Classification Search
CPC ....... H01M 4/13; H01M 4/0404; H01M 4/139
See application file for complete search history.

(56) References Cited

U.S. PATENT DOCUMENTS

2002/0037457 A1*  3/2002  Choi ...................... C22C 24/00
                                                    429/231.95
2002/0039680 A1*  4/2002  Hwang ................. H01M 4/136
                                                    429/218.1
(Continued)

FOREIGN PATENT DOCUMENTS

CN      1990097 A      7/2007
JP      H04342966 A    11/1992
(Continued)

OTHER PUBLICATIONS

Partial Supplemental Search Report from European Application No. 14769902.9, dated Jun. 10, 2016.
(Continued)

*Primary Examiner* — Stephan J Essex
(74) *Attorney, Agent, or Firm* — Lerner, David, Littenberg, Krumholz & Mentlik, LLP

(57) ABSTRACT

The present disclosure relates to an electrode that may minimize an electrical resistance increase caused by a binder polymer or a conductive material used in the electrode and provide a high capacity, a method for manufacturing the same, and an electrochemical device comprising the electrode, and an electrode mix slurry is prepared using a high shearing mixing process for each step such that fine grained conductive material and a binder polymer are uniformly dispersed in an electrode mix, and a high capacity electrode
(Continued)

active material is used in the electrode mix, to manufacture a high capacity electrochemical device.

5 Claims, 7 Drawing Sheets

(51) Int. Cl.
| | |
|---|---|
| H01M 4/36 | (2006.01) |
| H01M 4/485 | (2010.01) |
| H01M 4/505 | (2010.01) |
| H01M 4/525 | (2010.01) |
| H01M 10/052 | (2010.01) |
| H01M 4/139 | (2010.01) |
| H01M 4/13 | (2010.01) |
| H01M 4/38 | (2006.01) |
| H01M 4/66 | (2006.01) |
| H01M 4/131 | (2010.01) |
| H01M 4/1391 | (2010.01) |

(52) U.S. Cl.
CPC ........... *H01M 4/139* (2013.01); *H01M 4/364* (2013.01); *H01M 4/386* (2013.01); *H01M 4/387* (2013.01); *H01M 4/485* (2013.01); *H01M 4/505* (2013.01); *H01M 4/525* (2013.01); *H01M 4/623* (2013.01); *H01M 4/625* (2013.01); *H01M 4/626* (2013.01); *H01M 4/663* (2013.01); *H01M 10/052* (2013.01); *H01M 4/131* (2013.01); *H01M 4/1391* (2013.01)

(56) References Cited

U.S. PATENT DOCUMENTS

| | | | | |
|---|---|---|---|---|
| 2003/0087152 | A1* | 5/2003 | Shindo | ................ H01M 4/0404 429/217 |
| 2004/0013942 | A1* | 1/2004 | Fukumoto | ................ H01B 1/04 429/231.8 |
| 2004/0121195 | A1 | 6/2004 | Ghantous et al. | |
| 2005/0191550 | A1 | 9/2005 | Satoh et al. | |
| 2005/0227146 | A1 | 10/2005 | Ghantous et al. | |
| 2005/0238958 | A1 | 10/2005 | Kim | |
| 2006/0286458 | A1 | 12/2006 | Sato et al. | |
| 2008/0032192 | A1 | 2/2008 | Yokomizo et al. | |
| 2008/0107966 | A1 | 5/2008 | Lin et al. | |
| 2009/0104530 | A1 | 4/2009 | Shizuka et al. | |
| 2009/0155662 | A1* | 6/2009 | Durante | ................ C08J 5/2281 429/500 |
| 2009/0267028 | A1 | 10/2009 | Hoshiba | |
| 2009/0301866 | A1 | 12/2009 | Zaghib et al. | |
| 2010/0062338 | A1 | 3/2010 | Golightly et al. | |
| 2010/0112441 | A1 | 5/2010 | Fukumine et al. | |
| 2011/0020709 | A1 | 1/2011 | Fukumine et al. | |
| 2012/0225199 | A1* | 9/2012 | Muthu | ................ H01M 4/131 427/126.4 |
| 2016/0043404 | A1* | 2/2016 | Freydina | ................ H01M 4/625 429/188 |

FOREIGN PATENT DOCUMENTS

| | | |
|---|---|---|
| JP | 2003203634 A | 7/2003 |
| JP | 2004214182 A | 7/2004 |
| JP | 2007027084 A | 2/2007 |
| JP | 2007042285 A | 2/2007 |
| JP | 2010061996 A | 3/2010 |
| JP | 2012119078 A | 6/2012 |
| KR | 100560546 B1 | 3/2006 |
| KR | 2008-0042968 A | 5/2008 |
| KR | 100863167 B1 | 10/2008 |
| KR | 2008-0108222 A | 12/2008 |
| KR | 20100114055 A | 10/2010 |
| KR | 101145918 B1 | 5/2012 |
| WO | 2008120786 A1 | 10/2008 |

OTHER PUBLICATIONS

International Search Report for Application No. PCT/KR2014/002313 dated Jul. 10, 2014.

* cited by examiner

//ELECTRODE FOR ELECTROCHEMICAL DEVICE WITH LOW RESISTANCE, METHOD FOR MANUFACTURING THE SAME, AND ELECTROCHEMICAL DEVICE COMPRISING THE ELECTRODE

CROSS-REFERENCE TO RELATED APPLICATION

This application is a national phase entry under 35 U.S.C. § 371 of International Application No. PCT/KR2014/002313, filed Mar. 19, 2014, published in Korean, which claims priority to Korean Patent Application No. 10-2013-0029335, filed Mar. 19, 2013 and Korean Patent Application No. 10-2014-0031969, filed Mar. 19, 2014, the disclosures of which are incorporated herein by reference.

TECHNICAL FIELD

The present disclosure relates to an electrode for an electrochemical device with low resistance, a method for manufacturing the same, and an electrochemical device comprising the electrode, and more particularly, to an electrode for an electrochemical device with lower resistance in which a binder polymer and a conductive material are spread in a smaller size, a method for manufacturing the same, and an electrochemical device comprising the electrode.

BACKGROUND ART

With the technology development and the growing demands for mobile devices, the demand for rechargeable electrochemical devices as an energy source is dramatically increasing, and research for electrochemical devices meeting various demands is being intensively conducted. Lithium secondary batteries may be given as a typical example of an electrochemical device.

A lithium secondary battery has a structure in which an electrode assembly is formed using a cathode and an anode, each manufactured by coating an active material on a current collector, with a separator interposed between the cathode and the anode, and the electrode assembly is impregnated with a non-aqueous electrolyte solution including a lithium salt.

The cathode and the anode are formed by coating a cathode mix slurry and an anode mix slurry on each current collector, respectively, and as a cathode active material, lithium cobalt-based oxide, lithium manganese-based oxide, lithium nickel-based oxide, and lithium composite oxide have been used, and as an anode active material, a carbon-based material has been mainly used.

Recently, a cathode active material having a high discharge capacity while sufficiently exhibiting high capacity characteristics, such as lithium nickel-based oxide, is attracting more attention. However, when an electrode mix slurry including a high capacity cathode active material is mixed by a general method, there are drawbacks of crystal structure destruction based on voltage zones and degradation of the properties of an anode solid electrolyte interphase (SEI) layer by generated metal ions.

As a graphite-based material being widely used as an anode active material nearly reaches its theoretical maximum capacity of 372 mAh/g, the graphite-based material exposes its limit in adequately serving as a quickly changing next generation energy source. In the case where lithium metal is used as an anode active material, high capacity may be achieved due to its very high energy density, but there is a safety issue and a short cycle life problem caused by dendrite during repeated charging and discharging. Besides, attempts have been made to use carbon nanotubes as an anode active material, but low productivity, high costs, and low initial efficiency of 50% or less of carbon nanotubes have been noted. Meanwhile, as it is known that silicon, tin, or an alloy thereof is capable of irreversibly intercalating and deintercalating a large amount of lithium through a compound forming reaction with lithium, recently research is being intensively conducted to use these materials as an anode active material. For example, due to having a theoretical maximum capacity of about 4020 mAh/g even higher than a graphite-based material, silicon is a promising high capacity anode active material.

A binder polymer serves for binding between active materials and between an active material and a current collector, and has a significant influence on battery characteristics by impeding volume expansion during battery charging and discharging. However, when an excessive amount of binder polymers is used to reduce a volume change during charging and discharging, separation of an active material from a current collector may diminish but electrical resistance increases due to an electrical insulation property of a binder polymer and an amount of active materials relatively reduces, resulting in reduced capacity.

More specifically, polyvinylidene fluoride (PVdF) being widely used as a binder polymer reduces in adhesive strength, brings about a safety issue, and causes environmental pollution by use of an organic solvent when preparing a slurry. To solve these problems of PVdF, a method which performs aqueous polymerization on an aqueous binder polymer such as styrene-butadiene rubber (SBR) and mixes it with a thickening agent and the like is proposed. An aqueous binder polymer is eco-friendly and has an advantage of a reduced content of binder polymer and consequently an increased battery capacity, but has a shortcoming of low electrical conductivity due to inclusion of polymer, namely, an insulation material.

A conductive material is added to an electrode mix to improve conductivity of an electrode. However, because a conductive material is hydrophobic, wettability is low and susceptibility of conductive material particles to agglomeration is great, so uniform dispersion and mixing with an active material or a binder polymer is impossible. Also, because a conductive material is incapable of permeating a binder polymer, namely, an insulation material, there is a limitation in improving electrical conductivity.

Recently, to meet the growing demand for a high capacity/low resistance electrochemical device in an electrochemical device market, the need for a fine grain size of a conductive material is increasing. In keeping up with a fine grain size of a conductive material, a conductive material reduces in size to a nanometer level, and as a consequence, susceptibility of a conductive material to agglomeration further increases, which makes uniform dispersion with an electrode active material and a binder polymer more difficult.

In particular, because a porous active material usually exhibit rheological properties of shear thickening characteristics, an electrode mix slurry using a porous active material has trouble with uniform dispersion with a conductive material.

DISCLOSURE

Technical Problem

The present disclosure is designed to solve the above technical problem, and therefore, the present disclosure is directed to obtaining a low resistance/high capacity battery by modifying a proper combination of a conductive material/a polymer binder/an active material and a manufacturing method.

Technical Solution

According to an aspect of the present disclosure, there is provided an electrode including an active material component, a binder polymer, and a conductive material, wherein the binder polymer is bonded to the conductive material, and the bonded binder polymer has a molecular weight in a range of 27,000 to 380,000.

The binder polymer may have a molecular weight in a range of 69,000 to 100,000.

The binder polymer may be any one selected from the group consisting of polytetrafluoroethylene, polyvinylidene fluoride, and acrylated styrene butadiene rubber, or mixtures thereof.

The binder polymer may be any one selected from the group consisting of carboxy methyl cellulose, styrene butadiene rubber, polytetrafluoroethylene, and liquid silicone rubber (LSR), or mixtures thereof.

The conductive material may be any one selected from the group consisting of carbonaceous material including natural graphite, artificial graphite, carbon black, acetylene black, Ketjen black, carbon fibers; metallic material including metal power or metal fiber of copper, nickel, aluminum, silver; and conductive polymer including polyphenylene derivatives, or mixtures thereof.

The conductive material may have a primary agglomerate grain diameter from 5 nm to 100 nm.

The conductive material may have a secondary agglomerate grain diameter from 30 nm to 1 μm.

The active material component may be any one selected from the group consisting of a compound represented by $Li_aNi_xMn_yCo_zO_2$ where $0.6<a/(x+y+z)<1.0$ and $1.4<x+y+z<2.5$, $LiCoO_2$, and $LiFeO_4$, or a mixture thereof.

The active material component may be a silicon-based compound, a tin-based compound, or a mixture thereof.

The binder polymer may be used in an amount of 5 to 10 parts by weight based on 100 parts by weight of active material solid content.

The conductive material may be used in an amount of 3 to 15 parts by weight based on 100 parts by weight of active material solid content.

According to another aspect of the present disclosure, there is provided an electrochemical device including the above electrode.

The electrochemical device may be a lithium secondary battery.

The electrochemical device may operate in a voltage range of 4.2V or higher (full-cell) as an operating voltage.

According to another aspect of the present disclosure, there is provided a method for manufacturing an electrode, including performing a first high shearing mixing of a slurry including a binder polymer dispersed therein, adding a conductive material to the slurry, and performing a second high shearing mixing, adding an electrode active material and dispersing the same in the obtained slurry to obtain an electrode mix slurry, and coating the electrode mix slurry on a current collector and drying.

Each of the first high shearing mixing and the second high shearing mixing may be independently performed by a beads mil, a microfludizer, a Fil mixer, or a planetary dispersive mixer.

Each of the first high shearing mixing and the second high shearing mixing may be performed at 20,000 to 40,000 psi.

The binder polymer after the first high shearing mixing process may have a molecular weight in a range of 27,000 to 380,000.

The slurry after the second high shearing mixing process may have an absolute value of Zeta potential in a range of 20 mV to 100 mV.

Advantageous Effects

According to an aspect of the present disclosure, low resistance of an electrochemical device to be finally fabricated is enabled by uniform dispersion of a fine-grained conductive material between active materials. Also, when a high capacity active material is used, an electrochemical device with low resistance and high capacity characteristics may be obtained.

BEST MODE FOR CARRYING OUT THE INVENTION

Figure 1A:
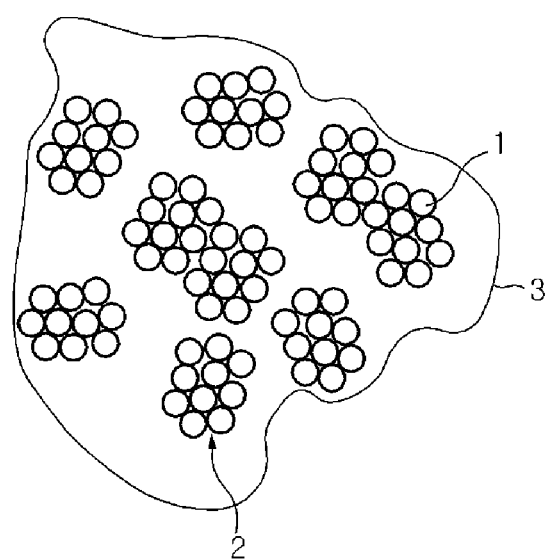
FIG. 1a schematically illustrates an example of binding of a binder polymer and a conductive material in an electrode mix slurry prepared according to a related art, and FIG. 1b schematically illustrates an example of binding of a binder polymer and a conductive material in an electrode mix slurry prepared according to an exemplary embodiment of the present disclosure.

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

According to an aspect of the present disclosure, there is provided an electrode mix slurry in which a conductive material is uniformly dispersed with an active material and a binder polymer.

The binder polymer that may be used in the electrode mix slurry needs to bind active material particles and bind an active material to a current collector. Non-limiting examples of the binder polymer include polyvinylalcohol, carboxymethylcellulose, hydroxypropylcellulose, diacetylcellulose, polyvinylchloride, polyvinylchloride carboxylated, polyvinylfluoride, polymer with ethylene oxide, polyvinylpyrrolidone, polyurethane, polytetrafluoroethylene, polyvinylidene fluoride, polyethylene, polypropylene, styrene butadiene rubber, acrylated styrene butadiene rubber, epoxy resin, and nylon.

When making a cathode mix, an organic solvent such as N-methyl pyrrolidone (NMP) is usually used, and in this case, a solution-type binder polymer such as polyvinylidene fluoride (PVDF) may be preferably used. An anode mix is usually aqueous, and in this case, an emulsion-type binder polymer such as styrene butadiene rubber (SBR) and a thickening agent carboxy methyl cellulose (CMC) may be preferably used. For example, as a binder polymer for a cathode mix, polytetrafluoroethylene, polyvinylidene fluoride, and acrylated styrene butadiene rubber may be used, and as a binder polymer for an anode mix, carboxy methyl cellulose, styrene butadiene rubber, polytetrafluoroethylene, and liquid silicone rubber (LSR) may be used, but the present disclosure is not limited thereto.

A molecular weight of a binder polymer before a first high shearing mixing process is not specially limited, and for example, may be in a range of approximately several hundreds of thousands to several millions, but after a first high shearing mixing process according to the present disclosure, a binder polymer goes through segmentation and has a molecular weight in a range of 27,000 to 380,000 or in a range of 69,000 to 100,000. When a molecular weight of a binder polymer is less than 27,000, dispersibility reduces, and when a molecular weight of a binder polymer is higher than 380,000, re-agglomeration causes degradation of dispersion characteristics. More preferably, a binder polymer has a molecular weight in a range of 69,000 to 100,000.

The binder polymer may be used in an amount of 5 to 10 parts by weight based on 100 parts by weight of the solid content of the active material used in the electrode mix slurry.

The binder polymer is included in a solvent to form a binder polymer dispersion solution (slurry). As the solvent, a typical solvent used in the art may be used, and as a non-limiting example, N-methyl pyrrolidone, methanol, ethanol, n-propanol, isopropanol, mixtures thereof, or water may be given.

A conductive material is a substance used to impart electrical conductivity to an electrode, and any material may be used if a material is electrically conductive while not causing a chemical change in a battery to be fabricated.

Non-limiting examples of conductive materials usable in the present disclosure may include a carbon-based material such as natural graphite, artificial graphite, carbon black, acetylene black, Ketjen black, and carbon fibers; a metallic material such as metal powder or a metal fiber of copper, nickel, aluminum, and silver; conductive polymer such as a polyphenylene derivative, or mixtures thereof.

A size of the conductive material is not specially limited, but to meet the need for a fine grain size of the conductive material, a primary agglomerate grain diameter from 5 nm to 100 nm and a secondary agglomerate grain diameter from 30 nm to 1 μm are preferred. When the conductive material has a grain diameter in the above range, a sufficient electrical contact between active materials is enabled because it is enough to enter interstitial volumes among active materials.

The conductive material may be used in an amount of 3 to 15 parts by weight based on 100 parts by weight of the solid content of the active material included in the electrode mix slurry.

Figure 1B:
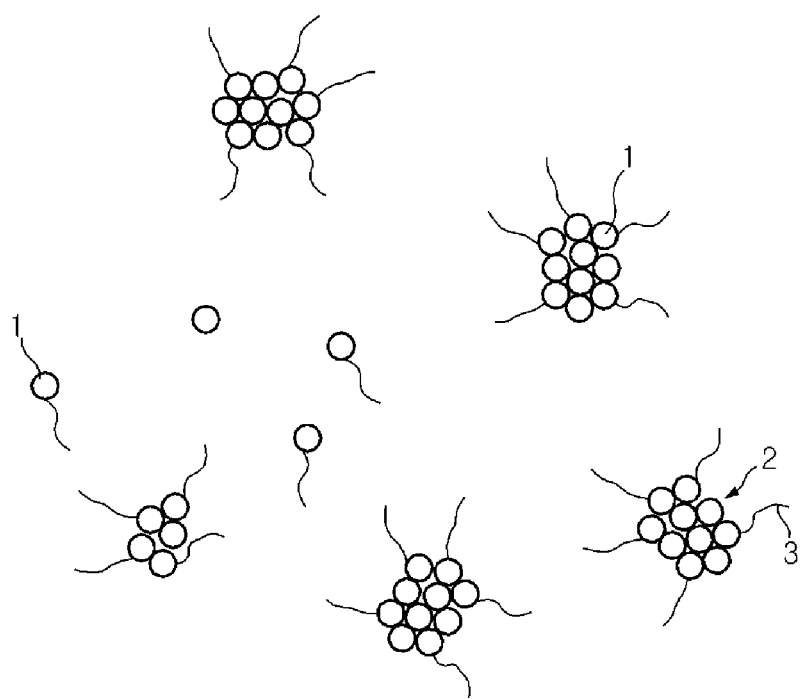

In regards to this, referring to FIGS. 1a and 1b, FIG. 1a schematically illustrates an exemplary embodiment in which a conductive material is added to a slurry including a binder polymer according to a related art, and FIG. 1b schematically illustrates an exemplary embodiment in which a conductive material is dispersed in a slurry including a binder polymer according to an exemplary embodiment of the present disclosure.

In FIG. 1a, conductive material primary agglomerates 1 agglomerate together to form a secondary agglomerate 2, and such secondary agglomerates 2 also agglomerate together by a zipper bag effect and a binder polymer 3 surrounds them.

In contrast, in the case of a conductive material of FIG. 1b, primary agglomerates 1 agglomerate together to form a secondary agglomerate 2 but secondary agglomerates 2 are individually scattered. That is, agglomeration by a zipper bag effect doesn't occur to a plurality of secondary agglomerates, and each of the secondary agglomerates is surrounded by a binder polymer 3.

As an electrode active material that may be used in the present disclosure, an electrode active material typically used in the art may be used, but to fabricate a high capacity battery, it is preferred to use a cathode active material and/or an anode active material enabling high capacity.

The term 'high capacity battery' as used herein represents a battery which operates in a voltage range of 4.2V or higher (full-cell) as an operating voltage.

As a non-limiting example of a cathode active material enabling high capacity, a cathode active material represented by $Li_aNi_xMn_yCo_zO_2$ where $0.6<a/(x+y+z)<1.0$ and $1.4<x+y+z<2.5$, for example, $LiCoO_2$ and $LiFeO_4$ may be given.

A non-limiting example of an anode active material that may be used in the present disclosure may include carbon and graphite materials such as natural graphite, artificial graphite, expandable graphite, carbon fiber, non-graphitizable carbon, carbon black, carbon nanotubes, fullerene, activated carbon; metals alloyable with lithium such as Al, Si, Sn, Ag, Bi, Mg, Zn, In, Ge, Pb, Pd, Pt, and Ti and compounds including such elements; composites of metals and their compounds and carbon and graphite materials; and lithium containing nitrides. Particularly, to fabricate a high capacity battery, a high capacity anode active material such as a silicon-based or tin-based anode active material is preferred. Non-limiting examples of silicon-based or tin-based anode active materials may include silicon (Si) particles, tin (Sn) particles, silicon-tin alloy particles, alloy particles thereof, and composites thereof. The alloy may typically include, but is not limited to, for example, solid solutions, intermetallic compounds, and eutectic alloys of aluminum (Al), manganese (Mn), iron (Fe), and titanium (Ti) in silicon. A silicon or tin particle size is in a range of 0.1 to 5 μm, preferably, 0.1 to 2 μm, more preferably, 0.1 to 1 μm.

Figure 2A:
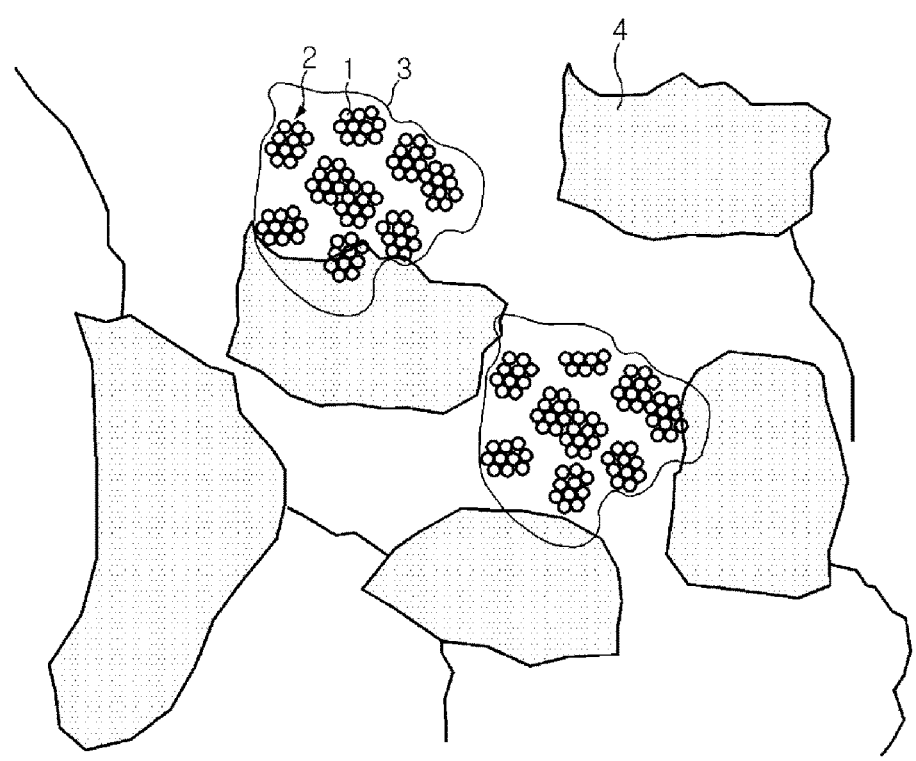
FIG. 2a schematically illustrates an example of binding of an active material, a binder polymer, and a conductive material in an electrode mix slurry prepared according to a related art, and FIG. 2b schematically illustrates an example of binding of an active material, a binder polymer, and a conductive material in an electrode mix slurry prepared according to the present disclosure.
Figure 2B:
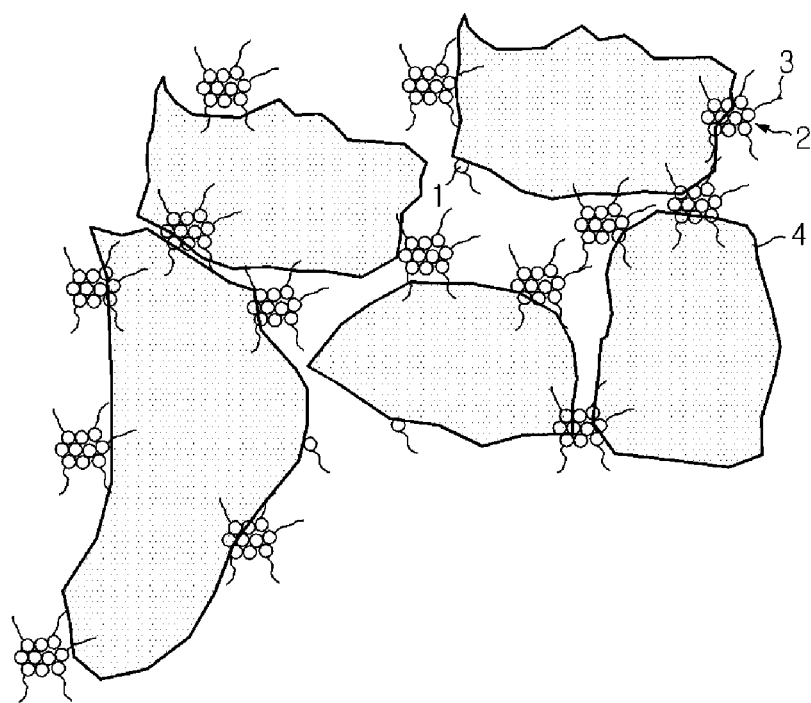

In regards to this, referring to FIGS. 2a and 2b, FIG. 2a schematically illustrates an exemplary embodiment in which an active material, a binder polymer, and a conductive material are dispersed according to a related art, and FIG. 2b schematically illustrates an exemplary embodiment in which an active material, a binder polymer, and a conductive material are dispersed according to the present disclosure.

Referring to FIG. 2a, secondary agglomerates 2 formed by conductive material primary agglomerates 1 are bunched together by a zipper bag effect and surrounded by a binder polymer 3, and a conductive material and a binder polymer are disposed in interstitial volumes among active materials 4.

In contrast, as shown in FIG. 2b illustrating an exemplary embodiment of the present disclosure, conductive material secondary agglomerates 2 formed by conductive material primary agglomerates 1 have a smaller size than the secondary agglomerate of FIG. 2a, and each of the conductive material secondary agglomerates 2 is surrounded by a binder polymer 3 and disposed in interstitial volumes among active materials 4.

As seen from a comparison of FIGS. 2a and 2b, a conductive material according to an exemplary embodiment of the present disclosure is less susceptible to agglomeration and may be spread in a smaller scale than a conductive material according to a related art, and a binder polymer is also formed in a small size and bonded to a conductive material, as a result, the conductive material and the binder polymer bonded thereto may be more uniformly dispersed in active material interstitial volumes. Accordingly, a higher electrical conduction effect and an active material binding effect may be produced.

Dissimilar to a zipper bag effect (see FIG. 1a) appearing when a conductive material, a binder polymer, and an active material are mixed and dispersed in one process according to a related art, in an exemplary embodiment of the present disclosure, wetting properties are imparted to each of conductive material primary agglomerates, thereby ensuring high dispersibility/bondability as shown in FIG. 1b.

The dispersibility of the electrode mix slurry of the present disclosure may be determined through an absolute value of Zeta potential. Here, "zeta potential" is an index indicating an amount of surface charge of colloidal particles suspended in a liquid, and is a value of particle movement speed which is calculated in consideration of an applied electric field intensity and hydrodynamic effect (viscosity and dielectric constant of a solvent) when colloidal particles move in an opposite direction to the sign of surface potential owing to an electric field applied outside. That is, as an absolute value of Zeta potential becomes higher, a repulsive force between particles increases and dispersibility and dispersion retention increases, and on the contrary, as Zeta potential approaches 0, particles are more susceptible to agglomeration.

An electrode mix slurry obtained by a typical mixing process generally has Zeta potential in a range of 5 mV to 20 mV, while the electrode mix slurry of the present disclosure has Zeta potential in a range of 20 mV to 100 mV, and this represents high dispersibility of the electrode mix slurry of the present disclosure.

The electrode mix slurry according to an exemplary embodiment of the present disclosure may further include a thickening agent, a filler, a coupling agent, and an adhesion promoter, in addition to the active material, the binder polymer, and the conductive material described in the foregoing.

According to another aspect of the present disclosure, there is provided a method for manufacturing an electrode including performing a first high shearing mixing of a slurry including a binder polymer, adding a conductive material to the slurry and performing a second high shearing mixing, adding an electrode active material and dispersing it in the obtained slurry to obtain an electrode mix slurry, and coating the electrode mix slurry on a current collector and drying it.

According to an exemplary embodiment of the present disclosure, the mixing of the electrode mix slurry is performed at each step, and each of the binder polymer and the conductive material is dispersed by high shearing mixing, but the active material may be mixed by a general stirring method in the art.

The binder polymer having a molecular weight of levels from tens of thousands to hundreds of thousands by the first high shearing mixing has a molecular weight of a significantly reduced level. Preferably, the binder polymer has a molecular weight in a range of 27,000 to 380,000, more preferably, in a range of 69,000 to 100,000.

Also, the second high shearing mixing allows for uniform dispersion of the conductive material.

Each of the first and second high shearing mixing processes may be independently performed by a dispersing apparatus having a high shearing force, and as a non-limiting example of the dispersing apparatus having a high shearing force, a beads mil, a microfludizer, a Fil mixer, and a planetary dispersive mixer may be given. For example, in case in which an MFD mixer is used as a high shearing mixer, a high shearing mixing process may be performed with a shear pressure from 20,000 to 40,000 psi applied to a slurry passing through a capillary tube diameter of a 100 µm level.

Also, a high shearing mixer may be also applied to active material mixing according to requirements of a target product and properties of raw materials.

According to another aspect of the present disclosure, there is provided an electrochemical device in which the electrode mix slurry is coated on a current collector. The current collector is where movement of electrons occurs in an electrochemical reaction of the active material, and includes an anode current collector and a cathode current collector based on an electrode type.

The anode current collector is generally made with a thickness from 3 to 500 µm. The anode current collector is not specially limited if it is conductive while not causing a chemical change in the battery in question, and for example, copper, stainless steel, aluminum, nickel, titanium, baked carbon, copper or stainless steel treated with carbon, nickel, titanium or silver on the surface thereof, and an aluminum-cadmium alloy may be used.

The cathode current collector is generally made with a thickness from 3 to 500 µm. The cathode current collector is not specially limited if it has high conductivity while not causing a chemical change in the battery in question, and for example, stainless steel, aluminum, nickel, titanium, baked carbon, and aluminum or stainless steel treated with carbon, nickel, titanium or silver on the surface thereof may be used.

These current collectors may have a fine surface texture formed on the surface to reinforce the bond strength of the electrode active material, and may be used in various shapes, for example, a film, a sheet, a foil, a net, a porous product, a foam, a non-woven product, and the like.

After an electrode mix slurry was prepared, a metal foil, the electrode mix slurry was coated on a current collector, followed by drying and compression rolling, to manufacture a predetermined sheet-type electrode.

The present disclosure provides a lithium secondary battery including the electrode. The lithium secondary battery has a structure in which an electrode assembly including a cathode and an anode and a separator interposed between the cathode and the anode is impregnated with a lithium salt-containing non-aqueous electrolyte solution.

The separator is interposed between the cathode and the anode, and an insulating thin film having high ion permeability and mechanical strength is used. A pore diameter of the separator is generally from 0.01 to 10 µm, and a thickness is generally from 5 to 300 µm. As the separator, for example, a sheet or non-woven fabric made from hydrophobic and chemical resistant olefin-based polymer such as polypropylene, glass fiber or polyethylene may be used, or a film formed by coating inorganic particles on one surface or both surfaces of the sheet or non-woven fabric may be used. Where a solid electrolyte such as polymer is used as an electrolyte, the solid electrolyte may be also used as a separator.

The lithium salt-containing non-aqueous electrolyte solution includes a non-aqueous electrolyte solution and lithium. The non-aqueous electrolyte solution may include a liquid solvent, a solid electrolyte, and an inorganic solid electrolyte. The liquid solvent may include an organic solvent, for example, N-methyl-2-pyrrolidone, propylene carbonate, ethylene carbonate, fluoro ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The organic solid electrolyte may include polyethylene derivatives, polyethylene oxide derivatives, polypropylene oxide derivatives, phosphoric acid ester polymers, polyvinyl alcohols, polyvinylidene fluoride, and polymers containing ionic dissociation groups. The inorganic solid electrolyte may include nitrides, halides, and sulfides of Li. The lithium salt is a material that is soluble in the non-aqueous electrolyte, and may include, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, lithium tetraphenyl borate, and imide.

MODE FOR CARRYING OUT THE INVENTION

Hereinafter, the present disclosure will be described in more detail in embodiment examples and comparative examples, but the scope of the present disclosure should not be construed as being limited thereto.

Embodiment Example 1: Preparation of a Binder Polymer Slurry and its Viscosity Behavior A carboxy methyl cellulose (CMC) binder polymer of an initial molecular weight (Mw) of levels from 100,000 to 110,000 was dissolved in an N-methyl pyrrolidone solution at a level of about 2 wt %, and after mixing by a high shearing mixer, viscosity behavior vs pass number was shown in FIG. 3. This viscosity behavior measurement is based on shearing thickening behavior appearing in the event of insufficient wetting of a conductive material network.

Figure 3:
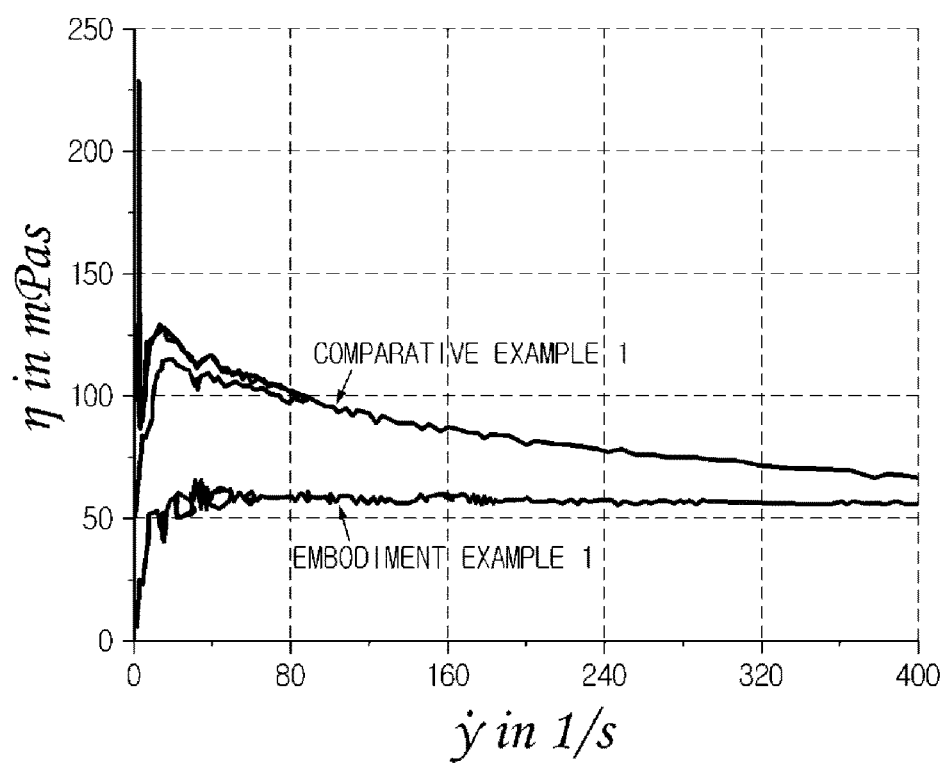
FIG. 3 is a graph showing viscosity of a slurry including a binder polymer prepared in Embodiment example 1 and Comparative example 1.

As seen in FIG. 3, the CMC slurry shows characteristics close to Newtonian behavior during several passes. In this instance, an MFD mixer was used as the high shearing mixer, and a shear pressure applied to the slurry was from 20,000 to 40,000 psi as the slurry passes through a capillary tube diameter of a 100 μm level.

Figure 4:
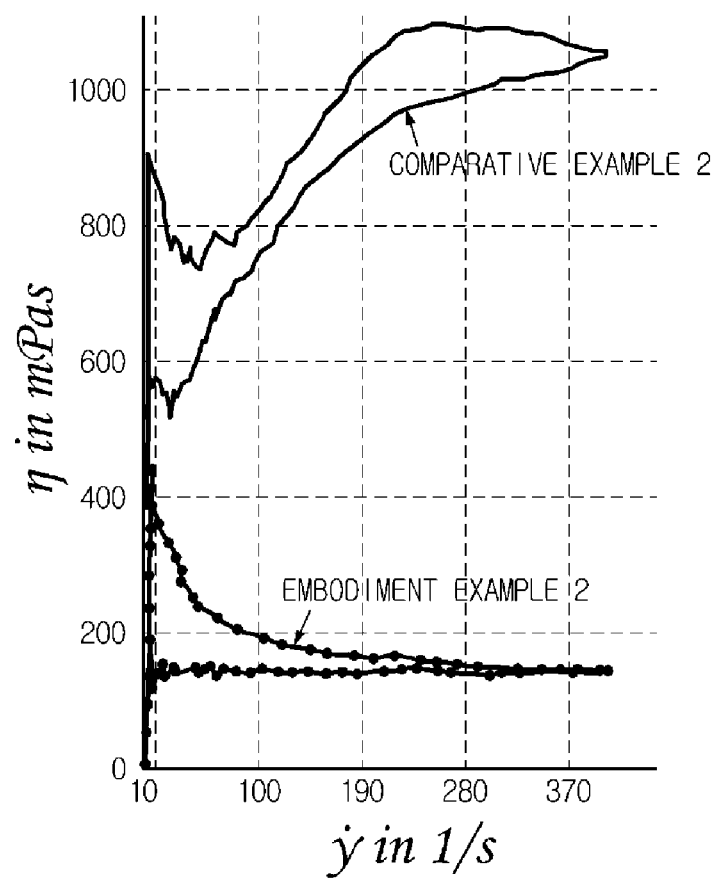
FIG. 4 is a graph showing viscosity of a slurry including a binder polymer and a conductive material prepared in Embodiment example 2 and Comparative example 2.

Embodiment Example 2: Preparation of a Slurry Including a Binder Polymer and a Conductive Material and its Viscosity Behavior Carbon black was added to the slurry of Embodiment example 1, and after mixing by a high shearing mixer, viscosity behavior vs pass number was shown in FIG. 4. From FIG. 4, it was found that, initially, shearing thickening behavior appeared in the event of insufficient wetting of a conductive material network, but with the increasing number of passes of high shearing mixing, changed to shearing thinning behavior similar to the CMC slurry behavior of Embodiment example 1. In this instance, an MFD mixer was used as the high shearing mixer, and a shear pressure applied to the slurry was from 20,000 to 40,000 psi as the slurry passes through a capillary tube diameter of a 100 μm level.

Embodiment Example 3: Fabrication of an Electrochemical Device

[Manufacture of a Cathode]

As a cathode active material, an NMC material including an Mn component in excess was mainly used, and mixed with acetylene black and PVDF mixed at a weight ratio of 90:5:5.

Subsequently, when the mixture was put in N-methylpyrrolidone as a solvent, high shearing mixing was performed using an MFD mixer at a shear pressure applied to a slurry less than or equal to 18,000 rpm as the slurry passes through a capillary tube diameter of a 100 μm level, to prepare a cathode mix slurry, and the cathode mix slurry was coated on a 20 μm thick aluminum foil by a doctor blade method, and after first drying, was tailored into a predetermined size (for example, 100×100 mm). Also, before cell assembling, drying was performed at 200° C. in a vacuum for about 3 days.

[Manufacture of an Anode]

After an anode active material using commonly available graphite and a high capacity material such as an Si-based material at a weight ratio of 9:1 was mixed with acetylene black, CMC, and SBR at a weight ratio of 8:1:1, and put in N-methylpyrrolidone as a solvent, high shearing mixing was performed using an MFD mixer at a shear pressure applied to a slurry less than or equal to 18,000 rpm as the slurry passes through a capillary tube diameter of a 100 μm level. An anode mix slurry was coated on a 10 μm thick copper foil by a doctor blade method, and after semi-drying, was tailored into a predetermined size. In this instance, before cell assembling, drying was performed at 120° C. in a vacuum for about 1 day.

[Preparation of an Electrolyte Solution]

A mixture of ethylene carbonate (EC):dimethyl carbonate (DMC):ethyl methyl carbonate (EMC) at a weight ratio of 3:4:3 was used as a solvent, and LiPF$_6$ was dissolved at a concentration of 1.2 mol/L, to prepare an electrolyte solution.

[Cell Assembling]

After a stack-type cell with a separator interposed between the prepared cathode and anode was manufactured, the stack-type cell was impregnated with an electrolyte solution and sealed together in a receiving case of a laminate film, and was left aside for about 24 hours.

Comparative Example 1: Preparation of a Binder Polymer Slurry and its Viscosity Behavior Instead of high shearing mixing, a mixing method under a general mixing condition, that is, using a planetary-dispersive mixer was performed at the max RPM level of about 2000 to 3000. In this method, conductive material dispersion may be poor, and for this reason, there is an inherent risk of cracking of a μm sized active material in a subsequent process. Except the above general mixing condition was used in place of high shearing mixing, a binder slurry was prepared by the same method of Embodiment example 1, and its viscosity behavior was shown in FIG. 3.

Comparative Example 2: Preparation of a Mixed Slurry of a Binder Polymer and a Conductive Material and its Viscosity Behavior Except mixing was performed under the above general mixing condition instead of high shearing mixing, a slurry was prepared by the same method of Embodiment example 2, and its viscosity behavior was shown in FIG. 4.

Comparative Example 3: Fabrication of an Electrochemical Device

Except a general mixing condition applied in Embodiment example 3, a cathode mix slurry and an anode mix slurry were prepared by the same method of Embodiment example 3, and an electrochemical device was fabricated.

Evaluation Example

Figure 5:
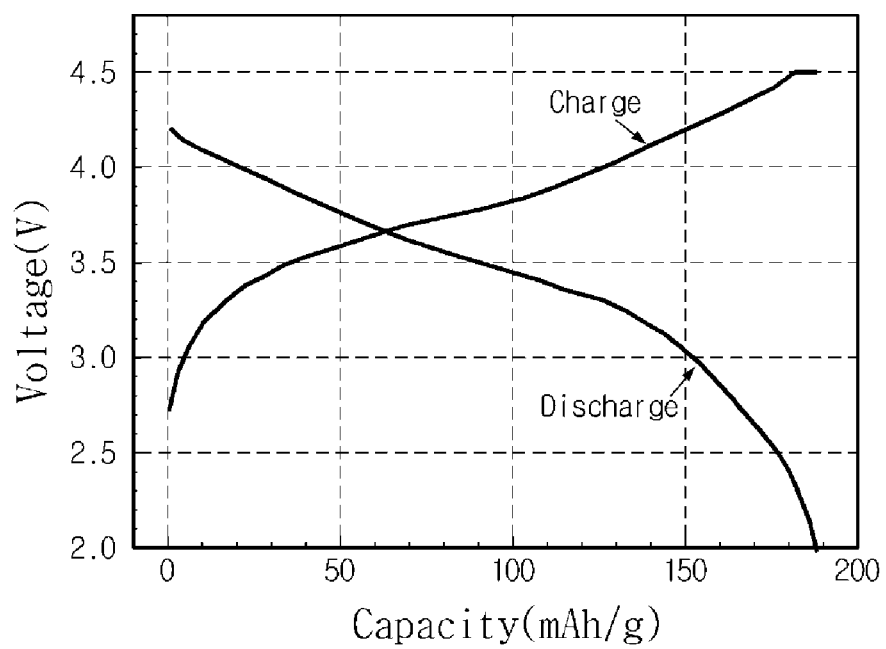
FIG. 5 is a charge/discharge graph of a lithium ion capacitor manufactured in Embodiment example 3.

Formation of the lithium ion capacitor prepared in Embodiment example 3 was enabled at a constant current under a condition from 4.6 to 2.0V. A resulting single layer pouch cell was charged and discharged in a range of 4.5 to 2.0V and a charge/discharge capacity was measured, and its results were shown in FIG. 5.

What is claimed is:

1. A method for manufacturing an electrode, comprising:
   mixing a first slurry including a binder polymer dispersed in a solvent, wherein the solvent is selected from N-methyl pyrrolidone;
   adding a conductive material to the first slurry to form a second slurry, mixing the second slurry;
   adding an electrode active material and dispersing the same in the mixed second slurry to obtain an electrode mix slurry, wherein the electrode active material is selected from a first group consisting of a compound represented by $Li_aNi_xMn_yCo_zO_2$ where $0.6<a/(x+y+z)<1.0$ and $1.4<x+y+z<2.5$, $LiCoO_2$, and $LiFeO_4$, and mixtures thereof, or selected from a second group consisting of a silicon-based compound, a tin-based compound, and a mixtures thereof;
   coating the electrode mix slurry on a current collector; and
   drying the electrode mix slurry on the current collect to form the electrode.

2. The method for manufacturing an electrode according to claim 1, wherein the mixing of the first slurry and the mixing of the second slurry is, independently, performed by a beads mil, a microfludizer, a Fil mixer, or a planetary dispersive mixer.

3. The method for manufacturing an electrode according to claim 1, wherein each of the mixing of the first slurry and the mixing of the second slurry is performed at a shear pressure ranging from 20,000 to 40,000 psi.

4. The method for manufacturing an electrode according to claim 1, wherein the binder polymer after the mixing of the first slurry has a molecular weight in a range of 27,000 to 380,000.

5. The method for manufacturing an electrode according to claim 1, wherein the second slurry after the mixing of the second slurry has an absolute value of Zeta potential in a range of 20 mV to 100 mV.

* * * * *